(12) United States Patent
Patel et al.

(10) Patent No.: US 11,704,414 B2
(45) Date of Patent: Jul. 18, 2023

(54) SYSTEMS AND METHODS FOR MANAGING VULNERABILITY DATA

(71) Applicant: JPMORGAN CHASE BANK, N.A., New York, NY (US)

(72) Inventors: Samiksha Patel, New York, NY (US); Jessica Colvin, New York, NY (US); Patrick M. Ward, Caldwell, NJ (US); Martin J. Grant, Jr., Middletown, DE (US); David Everett, New York, NY (US); Jean-Francois Legault, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 254 days.

(21) Appl. No.: 17/242,071

(22) Filed: Apr. 27, 2021

(65) Prior Publication Data

US 2021/0342450 A1 Nov. 4, 2021

Related U.S. Application Data

(60) Provisional application No. 63/017,545, filed on Apr. 29, 2020.

(51) Int. Cl.
*G06F 21/57* (2013.01)
*G06F 16/215* (2019.01)
*G06F 21/60* (2013.01)
*H04L 9/40* (2022.01)

(52) U.S. Cl.
CPC .......... *G06F 21/577* (2013.01); *G06F 16/215* (2019.01)

(58) Field of Classification Search
CPC .... G06F 21/577; G06F 16/215; G06F 21/604; H04L 63/1433; H04L 63/20
See application file for complete search history.

(56) References Cited

U.S. PATENT DOCUMENTS

| | | | |
|---|---|---|---|
| 9,350,750 B1 * | 5/2016 | Aval | H04L 63/1425 |
| 10,122,757 B1 * | 11/2018 | Kruse | H04L 63/10 |
| 10,277,619 B1 * | 4/2019 | Clark, II | H04L 63/1433 |
| 10,749,890 B1 * | 8/2020 | Aloisio | H04L 41/142 |
| 10,754,958 B1 * | 8/2020 | Sidagni | G06F 21/552 |
| 10,771,506 B1 * | 9/2020 | Kumar | H04L 63/02 |
| 11,157,629 B2 * | 10/2021 | Shenoy | G06F 21/577 |
| 11,201,891 B2 * | 12/2021 | Davis | G06F 21/554 |
| 11,265,330 B2 * | 3/2022 | Light | H04L 63/1408 |

(Continued)

*Primary Examiner* — Darren B Schwartz
(74) *Attorney, Agent, or Firm* — Greenberg Traurig LLP

(57) ABSTRACT

A method for managing vulnerability data may include: (1) ingesting, by a data ingestion engine, vulnerability data from a plurality of sources; (2) normalizing, by a data normalizer module, the vulnerability data into a plurality of data records; (3) generating, by a data processing module, a dynamic risk score for each data record; (4) storing, by a risk record register, a risk record for each data record, wherein the risk record may include the dynamic risk score, a priority level, an identifier for a software application, and a software dependency; (5) selecting, by a control policy selection engine, a control policy based on one of the dynamic risk scores; (6) implementing, by the risk record register, the selected control policy; (7) monitoring, by the risk record register, implementation of the control policy; and (8) updating, by the risk record register, the control policy selection engine based on the monitoring.

18 Claims, 2 Drawing Sheets

(56) References Cited

U.S. PATENT DOCUMENTS

| | | | | |
|---|---|---|---|---|
| 11,277,429 B2* | 3/2022 | Ababtain | H04L 63/1425 |
| 11,470,106 B1* | 10/2022 | Lin | H04L 63/1433 |
| 11,503,061 B1* | 11/2022 | Lin | G06Q 10/0635 |
| 11,562,088 B2* | 1/2023 | Levy | H04L 41/22 |
| 2006/0191012 A1* | 8/2006 | Banzhof | G06Q 10/06311 |
| | | | 726/25 |
| 2007/0094735 A1* | 4/2007 | Cohen | H04L 63/168 |
| | | | 713/188 |
| 2007/0157156 A1* | 7/2007 | Meier | G06F 21/554 |
| | | | 717/101 |
| 2011/0113467 A1* | 5/2011 | Agarwal | G06F 21/53 |
| | | | 718/1 |
| 2011/0209196 A1* | 8/2011 | Kennedy | H04L 63/101 |
| | | | 726/1 |
| 2015/0040228 A1* | 2/2015 | Lee | H04L 41/40 |
| | | | 726/25 |
| 2015/0237062 A1* | 8/2015 | Roytman | H04L 63/1433 |
| | | | 726/25 |
| 2016/0248799 A1* | 8/2016 | Ng | H04L 63/1433 |
| 2017/0085595 A1* | 3/2017 | Ng | G06Q 40/06 |
| 2017/0163677 A1* | 6/2017 | Gordon | G06F 16/24578 |
| 2017/0200006 A1* | 7/2017 | Gershoni | G06F 21/10 |
| 2017/0213037 A1* | 7/2017 | Toledano | H04L 63/06 |
| 2018/0324207 A1* | 11/2018 | Reybok, Jr. | G06F 16/951 |
| 2019/0114435 A1* | 4/2019 | Bhalla | G06F 21/55 |
| 2019/0268366 A1* | 8/2019 | Zeng | G06N 3/047 |
| 2020/0162497 A1* | 5/2020 | Iyer | H04L 63/164 |
| 2020/0242254 A1* | 7/2020 | Velur | G06F 21/552 |
| 2021/0019423 A1* | 1/2021 | DuBois | G06F 21/562 |

* cited by examiner

SYSTEMS AND METHODS FOR MANAGING VULNERABILITY DATA

RELATED APPLICATIONS

This application claims priority to, and the benefit of, U.S. Provisional Patent Application Ser. No. 63/017,545 filed Apr. 29, 2020, the disclosure of which is hereby incorporated, by reference, in its entirety.

BACKGROUND OF THE INVENTION

1. Field of the Invention

The present disclosure relates generally to systems and methods for managing vulnerability data.

2. Description of the Related Art

As an organization adopts, implements and manages its technology estate, vulnerabilities may be detected or identified. IT departments may respond to these vulnerabilities ad hoc by manually routing them to project workflows or individual project managers. Thus, managing vulnerabilities, from identification and prioritization to remediation and resolution, is time-consuming and manual.

SUMMARY OF THE INVENTION

Systems and methods for managing vulnerability data are disclosed. According to one embodiment, a method for managing vulnerability data may include: (1) ingesting, by a data ingestion engine, vulnerability data from a plurality of sources; (2) normalizing, by a data normalizer module, the vulnerability data into a plurality of data records, each data record having a predefined format and a plurality of pre-defined fields; (3) generating, by a data processing module, a dynamic risk score for each data record, wherein the dynamic risk score may be based on one or more rules; (4) storing, by a risk record register, a risk record for each data record, wherein the risk record may include the dynamic risk score, a priority level, an identifier for a software application, and a software dependency; (5) selecting, by a control policy selection engine, a control policy based on one of the dynamic risk scores; (6) implementing, by the risk record register, the selected control policy; (7) monitoring, by the risk record register, the implementation of the control policy; and (8) updating, by the risk record register, the control policy selection engine based on the monitoring.

In one embodiment, the data ingestion engine, the data normalizer module, and the data processing module may be triggered based on a state of the vulnerability record.

In one embodiment, the data ingestion engine receives the vulnerability data as a data stream.

In one embodiment, the data ingestion engine retrieves the vulnerability data from a plurality of data sources.

In one embodiment, the method may further include enriching the data record with data identifying a software environment.

In one embodiment, the method may further include de-duplicating, by the data processing module, the data records.

In one embodiment, the dynamic risk score may be further based on an asset sensitivity for an asset associated with a vulnerability associated with the data record, wherein the asset sensitivity may be based on a confidentiality impact on the asset, an integrity impact on the asset, and an availability impact on the asset.

In one embodiment, the method may further include generating a graphical output of a vulnerability across a plurality of systems; and displaying, on a display, the graphical output.

In one embodiment, the control policy may be implemented at an enforcement point or a tollgate.

In one embodiment, the control policy may include a safeguard or countermeasure to minimize security risks.

According to another embodiment, a system for managing vulnerability data may include: a data ingestion engine configured to ingest vulnerability data from a plurality of sources; a data normalizer module configured to normalize the vulnerability data into a plurality of data records, each data record having a predefined format and a plurality of pre-defined fields; a data processing module configured to generate a dynamic risk score for each data record, wherein the dynamic risk score may be based on one or more rules; a risk record register configured to store a risk record for each data record, wherein the risk record may include the dynamic risk score, a priority level, an identifier for a software application, and a software dependency; and a control policy selection engine configured to select a control policy based on one of the dynamic risk scores, wherein the risk record register may be configured to implement the selected control policy, monitor implementation of the control policy, and update the control policy selection engine based on the monitoring.

In one embodiment, the data ingestion engine, the data normalizer module, and the data processing module may be triggered based on a state of the vulnerability record.

In one embodiment, the data ingestion engine may be configured to receive the vulnerability data as a data stream.

In one embodiment, the data ingestion engine may be configured to receive the vulnerability data from a plurality of data sources.

In one embodiment, the data processing module may be further configured to enrich the data record with data identifying a software environment.

In one embodiment, the data processing module may be further configured to de-duplicate the data records.

In one embodiment, the dynamic risk score may be further based on an asset sensitivity for an asset associated with a vulnerability associated with the data record, wherein the asset sensitivity may be based on a confidentiality impact on the asset, an integrity impact on the asset, and an availability impact on the asset.

In one embodiment, the system may further include a dashboard engine configured to generate a graphical output of a vulnerability across a plurality of systems and display the graphical output.

In one embodiment, the control policy may be implemented at an enforcement point or a tollgate.

In one embodiment, the control policy may include a safeguard or countermeasure to minimize security risks.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
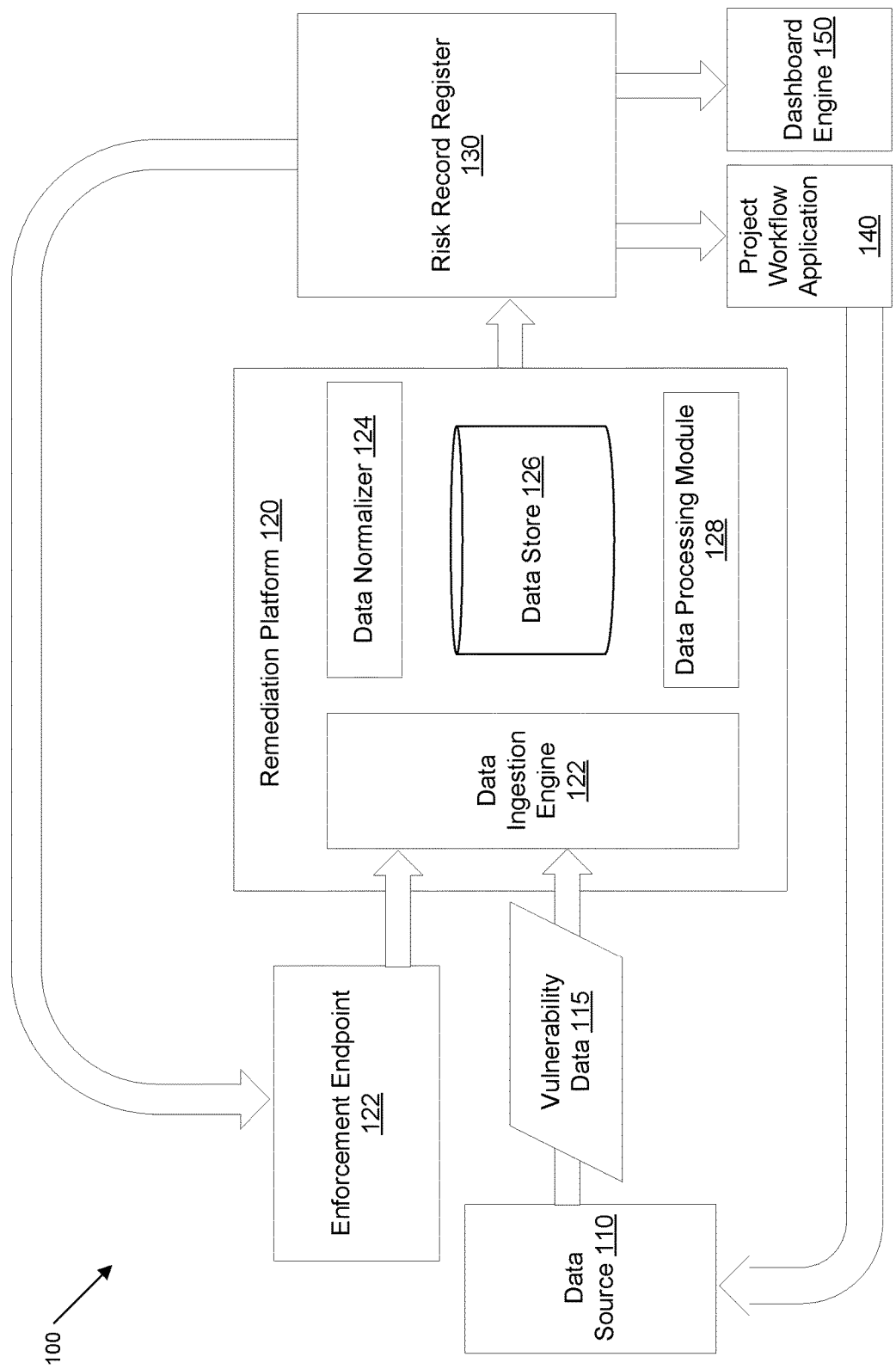
FIG. 1 depicts a system for managing vulnerability data according to one embodiment.

Embodiments are directed to systems and methods for managing vulnerability data. Embodiments may provide ingestion, enrichment, scoring, remediation, and may apply one or more control policy in an automated fashion.

The embodiments described herein are not intended to be limiting as to the scope, but rather are intended to provide examples of the components, use, and operation of the invention.

Embodiments are directed to a platform that provides automatic ingestion of vulnerability data to enrich it, derive risk scores, record the scores, automatically apply remediation, apply policy controls, and perform such operations as part of an automated process. Embodiments are directed to interfacing with a plurality of data sources to obtain vulnerability data. The vulnerability data may be processed by normalizing it, de-duplicating it, enriching it with contextual data, and storing the processed vulnerability data in a central repository.

The processed vulnerability data may be analyzed to generate a risk score for vulnerabilities expressed in the vulnerability data. The risk score may be ranked, categorized, prioritized, and/or used to describe the context or nature of the risk. The risk score may be tailored toward the organization's risk tolerance.

Upon generating a risk score, risk records may be registered within a registry. Various automated processes may perform routing, reporting, notification generating, and updating workflows based on the risk records. A dashboard may be provided to allow client devices to view analytics based on the risk records.

Embodiments are directed to an end-to-end process for managing and applying controls across a full ecosystem of handling technology vulnerabilities. Embodiments may provide at least some of the following: (1) ingestion and aggregation of disparate, non-structured data sources from various collection points which include auto-scan outputs, manual test results, manual discoveries, published national vulnerability database ("NVD") vulnerabilities and intelligence data into a normalized view; (2) provide a centralized inventory of normalized data for consumption/onward processing; (3) de-duplication, enrichment, and correlation of data from various scan and assessments sources for intelligent identification of vulnerabilities on critical assets; (4) derivation of a dynamic risk based score for findings within the context of asset sensitivity and incorporating threat intelligence, existing compensating controls, firewall connectivity and severity of the vulnerability to drive risk based prioritization of vulnerabilities; (5) risk record registration for heightened severity findings and breached risk indicators; (6) routing and integration of work items related to remediation activities through established resolver workflows with auto-loopback for validation of remediation activity based on workflow status; (7) visualization of findings in consumable dashboards for full risk management transparency to Stakeholders; and (8) application of control policy in an automated fashion through enforcement points/tollgates.

FIG. 1 illustrates a system for managing vulnerability data according to an embodiment. System 100 may be implemented within a computing system that may be made up of a combination of hardware and software. The computing system may comprise, for example, a server computer or any other system providing computing capability. Alternatively, the computing system may employ a plurality of computing devices that may be arranged, for example, in one or more server banks or computer banks or other arrangements. Such computing devices may be located in a single installation or may be distributed among many different geographical locations, in the cloud, etc. For example, the computing system may include a plurality of computing devices that together may comprise a hosted computing resource, a grid computing resource and/or any other distributed computing arrangement. In some cases, the computing system may correspond to an elastic computing resource where the allotted capacity of processing, network, storage, or other computing-related resources may vary over time. The computing system may implement one or more virtual machines that use the resources of the computing system. Various software components may be executed on one or more virtual machines.

Various applications and/or other functionality may be executed in the system 100 according to various embodiments. For example, the system 100 may include a data source(s) 110. A data source 110 may include third party software applications and/or modules coupled to third party software applications that generate vulnerability data 115. The data sources 110 may include enterprise scanning tools or include manual assessments based on third party software.

The vulnerability data 115 generated by the data sources may include files, data logs, database records, or other packets of information that may contain information relating to software vulnerabilities. For example, the vulnerability data 115 may include a report identifying a software application within an enterprise and specifying vulnerabilities relating to the implementation of the software application. A vulnerability may include an improper use of a software library, a software component with a high risk of exposure to third party attacks, software routines or data with a risk to security breaches, weakness to access in the system, non-compliant software, a breakage in dependencies between software components, or other software vulnerabilities.

In embodiments, software vendors may allow their software applications to generate vulnerability data 115 having a predefined vulnerability score. For example, software vendors may provide vulnerability scores in accordance with standards such as, for example, Common Vulnerability Scoring System ("CVSS"). These vulnerability scores may be considered to be vendor-based scores. Such vendor-based vulnerability data 115 lacks context and may not be useful to an organization without additional information about how the IT solutions of the organization is structured. For example, vulnerability data 115 may not account for specific configurations, implementations, environments, or contexts within the organization.

To enrich and make vulnerability data 115 more useful, the system 100 may include a remediation platform 120. The remediation platform 120 may include a data ingestion engine 122, a data normalizer 124, a data store 126, and a data processing module 128. The data ingestion engine 122, the data normalizer 124, the data store 126, and/or the data processing module 128 may operate based on the state of the vulnerability data 115, such as new vulnerability, updated vulnerability, new impacted asset found, score provided. Each of the data ingestion engine 122, the data normalizer 124, the data store 126, and/or the data processing module 128 may monitor the vulnerability data 115 for specific state changes to then trigger execution.

The data ingestion engine 122 may be configured to receive vulnerability data 115 and aggregate the vulnerability data 115 for subsequent processing. The data ingestion engine 122 may access disparate, non-structured data sources from various collection points that may include vulnerability data 115, such as auto-scan outputs, manual test results, manual discoveries, published vulnerabilities, intelligence data, etc. The data ingestion engine 122 may receive the vulnerability data 115 as a data stream, by systematically accessing various data sources 110 to retrieve vulnerability data 115, or by any suitable mechanism. In one embodiment, the data ingestion engine 122 may use Application Programming Interfaces ("APIs") to access various data sources 110 to receive vulnerability data 115.

The data normalizer 124 may be configured to combine the ingested vulnerability data 115 and to organize the ingested vulnerability data into a normalized format. For example, the data normalizer 124 may convert the vulnerability data 115 and format the vulnerability data 115 as one or more database records with predefined database fields. The data normalizer 124 may use regular expressions ("RegEx"), machine learning, trained data classifiers, or other tools to normalize the ingested data. The normalized data may be stored as a data record in the data store 126, which serves as a central repository. The normalized data may have a standard format.

The data processing module 128 may be configured to enrich the data records stored in the data store 126. For example, the data processing module 128 may de-duplicate, enrich, and/or correlate the data records for intelligent identification of vulnerabilities on critical assets. The data store 126 may generate metadata or populate database fields with values that provide context with respect to the organization's IT ecosystem. As another example, the data processing module 128 may operate according to a set of rules or a configuration file the provides insight about the organization's software ecosystem. In other words, the context of the software environment may be coded into the data processing module 128. In this respect, the data processing module 128 may analyze the data records and supplement or modify the data records with data to reflect the software ecosystem that is specific to the organization.

For example, if the same vulnerability data is received from different data sources 110, the data processing module 128 may de-duplicate such redundant vulnerability data. In addition, the data processing module 128 may correlate and/or combine the two data records reflecting the same or similar vulnerabilities. This removes redundancy and provides a more holistic view of the organization's software environment. The data processing module 128 may update the contents of the data store 126 with the processed vulnerability data.

In one embodiment, multiple data records may be merged into a single data record, resulting in an aggregate vulnerability record that describes the vulnerability from multiple sources. The context of how this aggregate was formulated (e.g., based on feeds X, Y, Z) may be maintained.

The merging or aggregating of the data records is possible due to the normalization of the vulnerability data. Thus, embodiments use a single language to compare vulnerabilities even though the vulnerability data may originate from different sources.

Embodiments may support various primary and secondary keys to merge the data that may be defined within the ingestion process. In embodiment, the primary and secondary keys may be learned using machine learning.

The remediation platform 120 may also generate a dynamic risk score based on the processed vulnerability data records that is generated by the data processing module 128. The remediation platform 120 may derive a dynamic risk score for findings within the context of asset sensitivity. For example, asset sensitivity may describe the impact of the asset in terms of confidentiality, integrity and availability of the asset. Confidentiality may describe the confidentiality of the data on the system. Integrity may describe whether the data has been manipulated. And impact may describe the impact of the asset not being available, such as denial of service.

The risk score may be dynamic and may change over time based on how risk is classified. In one embodiment, the risk score may include factors such as whether the system is externally-facing (i.e. accessible on the internet), levels of compensating controls to limit impact if compromised, how likely the asset is to be targeted by threat actor groups of concern (e.g., the attackers most likely to target the organization), etc. Other factors may be used as is necessary and/or desired.

The risk score may include threat intelligence, existing compensating controls, firewall connectivity, severity of the vulnerability, and/or asset sensitivity to drive risk-based prioritization of vulnerabilities. This allows for vulnerabilities identified in the vulnerability data 115 to be updated, modified, or re-assessed based on the assets of an organization (e.g., various software or computing tools).

The remediation platform 120 may provide the risk score(s) to a risk record register 130. For example, the dynamic risk score generated by the remediation platform 120 may be formatted into risk records that are then stored in the risk record register 130.

In embodiments, the risk records may provide different contexts for different systems. The risk records may store different interpretations of the data to serve those functions. For example, if a role is to update an operating system, the deep technical details of a vulnerability are not needed; instead, an identification of what assets to update and by what date to update them is needed.

The risk record register 130 may review the records for heightened severity findings and indicators of a risk of breach. The risk record register 130 may include a database.

Each risk record may include the dynamic risk score, a priority level, an identifier of the software applications relating to the vulnerability, the dependencies of any software components (e.g., libraries, resources, other applications, modules, etc.) relating to the vulnerability, and any other information as is necessary and/or desired.

The risk record register 130 and/or resolver workflows may implement remediation actions. Remediation actions may include the application of one or more rules, protocols, policies, data process flows, or other data procedures for routing information pertaining to risk records, implementing governance, risk treatment, or notification procedures. For example, a remediation action may be to interface with a project workflow application 140 and provide the risk record as an input. The project workflow application 140 may be an agile project management tool used for tracking software bugs, tracking requirements software requirements for development, generating user stories, or developing software. The risk record register 130 may use one or more APIs to interface with project workflow applications 140.

In one embodiment, the remediation action may be defined by business logic which may be set by the party responsible for the identified risk. In another embodiment, the remediation action may be automatically selected based on the business logic followed in past cases, the results of those cases, etc.

The remediation activity may involve established resolver workflows with auto-loopback for validation of remediation activity based on workflow status. To provide an example, if a risk record indicates that a software component is non-compliant, the risk record register 130 may embed information indicating the non-compliance into a project management tool. In one embodiment, this loopback may be used to train a machine learning engine to select an appropriate remediation action.

In addition, the remediation activity may use a notification procedure to generate alerts to predefined recipients. For example, the risk record register 130 may store a map file that cross references project managers with software applications so as to route issues with software applications to the correct project managers. Based on the contents of a risk record, a project manager may be automatically alerted by way of a notification.

The risk record register 130 may also interface with a dashboard engine 150. The dashboard engine may manage and create dashboards for different user accounts that provide information about the risk records to relevant users. A user may use a client device to access the dashboard and receive information about risk records that are specific to the user. The user may provide login credentials to access information about relevant risk records. This provides full risk management transparency to stakeholders.

Embodiments may provide a data-rich picture of a vulnerability and how the organization is impacted. Additionally, feedback mechanisms provide accurate current state of impacts and remediation actions. Thus, the dashboards may be targeted to the consuming user. This provides the consuming user with precise context, which saves time compared to traditional systems that require various pivoting on data across multiple systems. In essence, embodiments provide a single pane of glass.

The remediation activity may also include the application of one or more control policies. These control policies may be implemented an automated fashion through enforcement points/tollgates. For example, project management tools may implement enforcement points/tollgates that control the flow of requirements for a project or product. The control policies may automatically input (e.g., through the use of APIs) the information of a risk record into an enforcement point/tollgate to manage the flow of requirements.

Examples of control policies include safeguards or countermeasures to avoid, detect, counteract, or minimize security risks to physical property, information, computer systems, or other assets. The control policy may be used to mitigate the impact of a vulnerability, such as limiting vulnerable components from being deployed to production environments.

Figure 2:
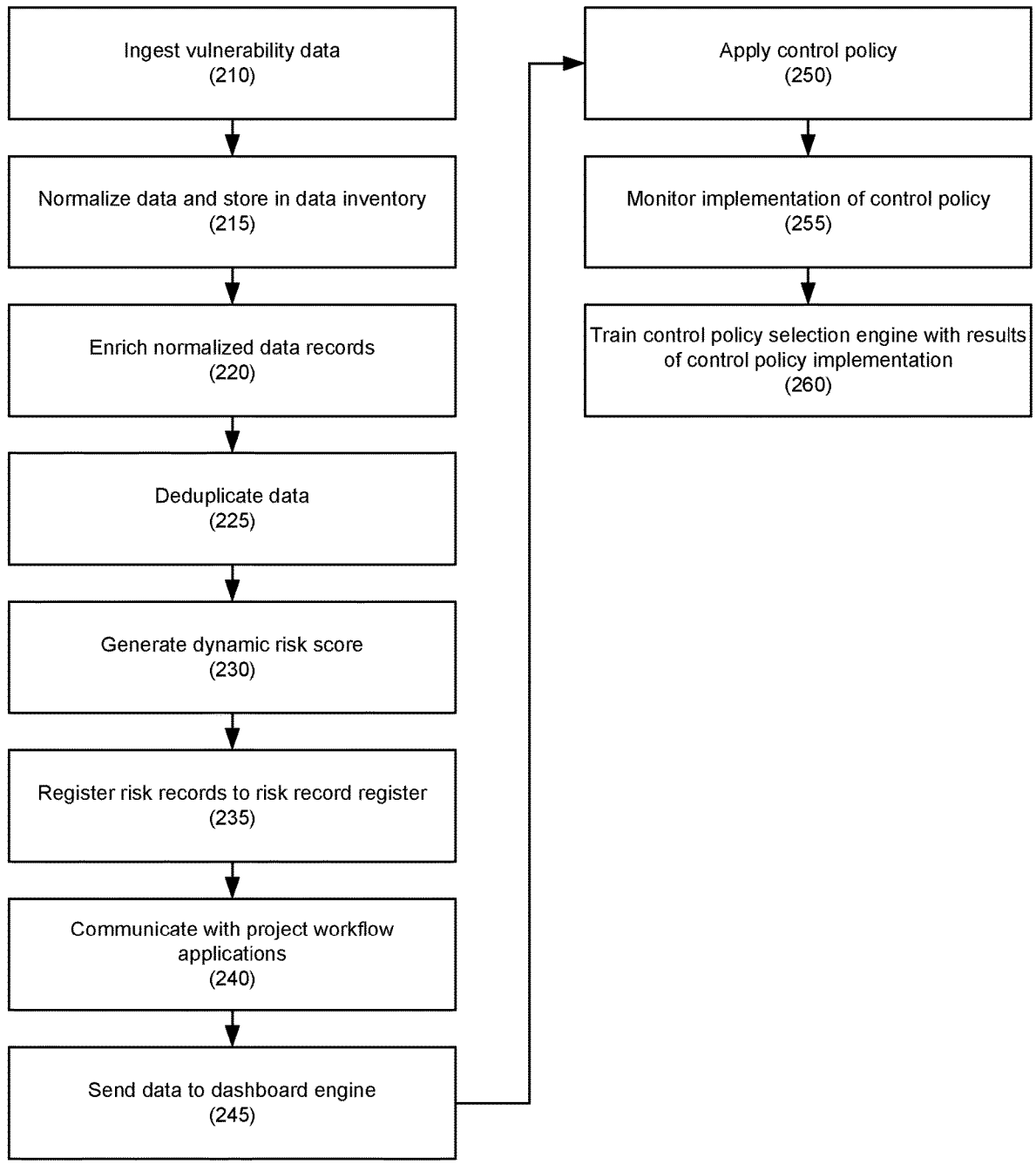
FIG. 2 depicts a method for managing vulnerability data according to one embodiment.

FIG. 2 depicts a method for managing vulnerability data according to one embodiment. In step 210, vulnerability data may be ingested by, for example, a data ingestion engine. Vulnerability data may be received from a variety of data sources such as, for example, scanners, or script files that scrape data from various sources. In one embodiment, the vulnerability data may include non-structured data, and may be received as a data stream, via APIs, etc.

In one embodiment, the vulnerability data may be in CVSS format.

In step 215, the vulnerability data may be normalized and stored in a data repository by a data normalizer. The vulnerability data may be normalized into a database record with predefined database fields.

In step 220, the data records may enrich the normalized data records. For example, the fields may be populated with metadata or values that provide context with respect to the organization's IT ecosystem. As another example, the normalized data records may be supplemented or modified to reflect the software ecosystem that is specific to the organization.

In embodiments, the context is used to enrich the database records. This may involve updating a vendor-provided vulnerability score that account for the context that an enterprise uses to implement software solutions.

In step 225, the data records may be de-duplicated by a data processing module. For example, redundant database records may be de-duplicated to optimize processing downstream. In addition, similar database records that partially overlap may be correlated and merged into single database records.

In step 230, a dynamic risk score may be generated by the data processing module. In some embodiments, the data processing module may use data that indicates the context of a software/computing environment or that identifies software/hardware assets.

For example, the manner in which the dynamic risks score is calculated may vary based on the organization's view of risk. The risk score calculation may be based on business rules based on any values within the normalization data model.

In one embodiment, the dynamic risk score may be calculated by first calculating a base score and then adjusting the base score.

In step 235, risk records may be registered to a risk record register. For example, a risk record may be generated based on the enriched database record. The risk record may include a dynamic risk score, a priority level, an identifier of the software applications relating to the vulnerability, the dependencies of any software components (e.g., libraries, resources, other applications, modules, etc.) relating to the vulnerability, and any other information as is necessary and/or desired.

In step 240, the risk records may be communicated to project workflow applications. For example, one or more APIs may be used to interface with third-party project workflow applications. Information pertaining to the risk record may be embedded within project workflow applications to alert project managers of software issues.

The actions taken by the third-party workflow applications may vary. For example, the third-party workflow applications may track vulnerability, add to Jira ticket to backlog for a team to remediation, trigger automated workflow to apply patch, add a case to a workflow to be resolved by team member, etc.

In step 245, the risk record register may communicate the risk records to a dashboard engine. For example, the risk record register may communicate a notification that new risk records are generated to the dashboard engine. In some embodiments, the dashboard engine may automatically retrieve risk records. The dashboard engine may perform data analytics on the risk records. The risk records and related analytics may be made available to client devices that access the dashboard engine.

In step 250, the risk record register may implement one or more control policies. In one embodiment, a control policy selection engine may identify one or more control policies to implement. In one embodiment, the control policy selection engine may select the one or more control policies based on historical data.

In some embodiments, the risk record register may use an API to access software-implemented enforcement point/tollgate. Information pertaining to the risk record may be inputted into the enforcement point/tollgate to facilitate a project workflow.

In step 255, the implementation of the one or more control policy may be monitored, and, in step 260, the results of the implementation may be fed back to train a control policy machine learning engine. In embodiments, the complexity of the control policies may vary based on, for example, the environment. In one embodiment, machine learning may be used to select the control policy, to change the restrictiveness of the tollgates, etc.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor. As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processors and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communication technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Java, Python, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for managing vulnerability data, comprising:
   ingesting, by a data ingestion engine, vulnerability data from a plurality of sources;
   normalizing, by a data normalizer module, the vulnerability data into a plurality of data records, each data record having a predefined format and a plurality of predefined fields;
   generating, by a data processing module, a dynamic risk score for each data record, wherein the dynamic risk score is based on one or more rules, and is further based on an asset sensitivity for an asset associated with a vulnerability associated with the data record, wherein the asset sensitivity is based on a confidentiality impact on the asset, an integrity impact on the asset, and an availability impact on the asset;
   storing, by a risk record register, a risk record for each data record, wherein the risk record comprises the dynamic risk score, a priority level, an identifier for a software application, and a software dependency;
   selecting, by a control policy selection engine, a control policy based on one of the dynamic risk scores;
   implementing, by the risk record register, the selected control policy;
   monitoring, by the risk record register, implementation of the control policy; and
   updating, by the risk record register, the control policy selection engine based on the monitoring.

2. The method of claim 1, wherein the data ingestion engine, the data normalizer module, and the data processing module are triggered based on a state of the vulnerability record.

3. The method of claim 1, wherein the data ingestion engine receives the vulnerability data as a data stream.

4. The method of claim 1, wherein the data ingestion engine retrieves the vulnerability data from a plurality of data sources.

5. The method of claim 1, further comprising:
enriching the data record with data identifying a software environment.

6. The method of claim 1, further comprising:
de-duplicating, by the data processing module, the data records.

7. The method of claim 1, further comprising:
generating a graphical output of a vulnerability across a plurality of systems; and
displaying, on a display, the graphical output.

8. The method of claim 1, wherein the control policy is implemented at an enforcement point or a tollgate.

9. The method of claim 1, wherein the control policy comprises a safeguard or countermeasure to minimize security risks.

10. A system for managing vulnerability data, comprising:
a data ingestion engine configured to ingest vulnerability data from a plurality of sources;
a data normalizer module configured to normalize the vulnerability data into a plurality of data records, each data record having a predefined format and a plurality of pre-defined fields;
a data processing module configured to generate a dynamic risk score for each data record, wherein the dynamic risk score is based on one or more rules and is further based on an asset sensitivity for an asset associated with a vulnerability associated with the data record, wherein the asset sensitivity is based on a confidentiality impact on the asset, an integrity impact on the asset, and an availability impact on the asset;
a risk record register configured to store a risk record for each data record, wherein the risk record comprises the dynamic risk score, a priority level, an identifier for a software application, and a software dependency; and
a control policy selection engine configured to select a control policy based on one of the dynamic risk scores, wherein the risk record register is configured to implement the selected control policy, monitor implementation of the control policy, and update the control policy selection engine based on the monitoring.

11. The system of claim 10, wherein the data ingestion engine, the data normalizer module, and the data processing module are triggered based on a state of the vulnerability record.

12. The system of claim 10, wherein the data ingestion engine is configured to receive the vulnerability data as a data stream.

13. The system of claim 10, wherein the data ingestion engine is configured to receive the vulnerability data from a plurality of data sources.

14. The system of claim 10, wherein the data processing module is further configured to enrich the data record with data identifying a software environment.

15. The system of claim 10, wherein the data processing module is further configured to de-duplicate the data records.

16. The system of claim 10, further comprising:
a dashboard engine configured to generate a graphical output of a vulnerability across a plurality of systems and display the graphical output.

17. The system of claim 10, wherein the control policy is implemented at an enforcement point or a tollgate.

18. The system of claim 10, wherein the control policy comprises a safeguard or countermeasure to minimize security risks.

* * * * *